(12) United States Patent
Saito

(10) Patent No.: US 8,908,924 B2
(45) Date of Patent: Dec. 9, 2014

(54) EXTERIOR ENVIRONMENT RECOGNITION DEVICE AND EXTERIOR ENVIRONMENT RECOGNITION METHOD

(71) Applicant: Fuji Jukogyo Kabushiki Kaisha, Tokyo (JP)

(72) Inventor: Toru Saito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 207 days.

(21) Appl. No.: 13/680,850

(22) Filed: Nov. 19, 2012

(65) Prior Publication Data
US 2013/0129150 A1    May 23, 2013

(30) Foreign Application Priority Data

Nov. 17, 2011  (JP) ................. 2011-251588

(51) Int. Cl.
*G06K 9/00* (2006.01)
*G06K 9/46* (2006.01)

(52) U.S. Cl.
CPC .............. *G06K 9/46* (2013.01); *G06K 9/00825* (2013.01)
USPC ......................................... 382/104; 382/173

(58) Field of Classification Search
None
See application file for complete search history.

(56) References Cited

U.S. PATENT DOCUMENTS

| 7,565,006 | B2 * | 7/2009 | Stam et al. ..................... 382/155 |
| 7,949,190 | B2 * | 5/2011 | Wu et al. ....................... 382/206 |
| 8,194,998 | B2 * | 6/2012 | Saito ............................. 382/274 |

FOREIGN PATENT DOCUMENTS

| JP | 09-267686 A | 10/1997 |
| JP | 3349060 | 9/2002 |
| JP | 2005-001425 A | 1/2005 |
| JP | 2006-059183 A | 3/2006 |
| JP | 3872179 | 10/2006 |
| JP | 2008-186342 A | 8/2008 |
| JP | 2008-186344 A | 8/2008 |

OTHER PUBLICATIONS

Japanese Office Action issued in Japanese Application No. 2011-251588 dated Dec. 24, 2013.
Japanese Office Action issued in Japanese Application No. 2011-251588 dated Oct. 1, 2013.

* cited by examiner

*Primary Examiner* — Matthew Bella
*Assistant Examiner* — Jose M Torres
(74) *Attorney, Agent, or Firm* — McDermott Will & Emery LLP

(57) ABSTRACT

There is provided an exterior environment recognition device and an exterior environment recognition method. The exterior environment recognition device obtains a first image in a first exposure mode according to a level of light of an exterior environment, and obtains a second image in a second exposure mode of which exposure time is different from the first exposure mode and which allows determination as to whether a light emitting source is emitting light by itself or not. The exterior environment recognition device identifies, based on the first image, a vehicle area occupied by a vehicle preceding in a detection area, identifies a position of the light emitting source, based on luminance of the second image, and associates the position of the light emitting source and the vehicle area.

9 Claims, 13 Drawing Sheets

| SPECIFIC OBJECT | | BRAKE LAMP (RED) | HIGH MOUNT STOP LAMP (RED) | TAIL LAMP (RED) | TURN SIGNAL (ORANGE) |
|---|---|---|---|---|---|
| 202 — LUMINANCE RANGE | R | ≥ 200 | ≥ 200 | ≥ 50 | ≥ 150 |
| | G | ≤ 50 | ≤ 50 | ≤ 50 | ≥ 100 |
| | B | ≤ 50 | ≤ 50 | ≤ 50 | ≤ 50 |
| 204 — HEIGHT RANGE (m) | | 0.3 TO 2.0 | 0.7 TO 2.0 | 0.3 TO 2.0 | 0.3 TO 2.0 |
| 206 — HORIZONTAL DISTANCE WIDTH RANGE (m) | | 0.05 TO 0.2 | 0.1 TO 0.5 | 0.05 TO 0.2 | 0.05 TO 0.2 |
| 208 — VERTICAL DISTANCE WIDTH RANGE (m) | | 0.05 TO 0.2 | 0.1 TO 0.5 | 0.05 TO 0.2 | 0.05 TO 0.2 |
| 210 — HORIZONTAL DISTANCE DIFFERENCE (m) | | 1.4 TO 1.9 | — | 1.4 TO 1.9 | 1.4 TO 1.9 |
| 212 — VERTICAL DISTANCE DIFFERENCE (m) | | ≤ 0.3 | — | ≤ 0.3 | ≤ 0.3 |
| 214 — SIZE RATIO (%) | | 50 TO 200 | — | 50 TO 200 | 50 TO 200 |

230

232

230

232

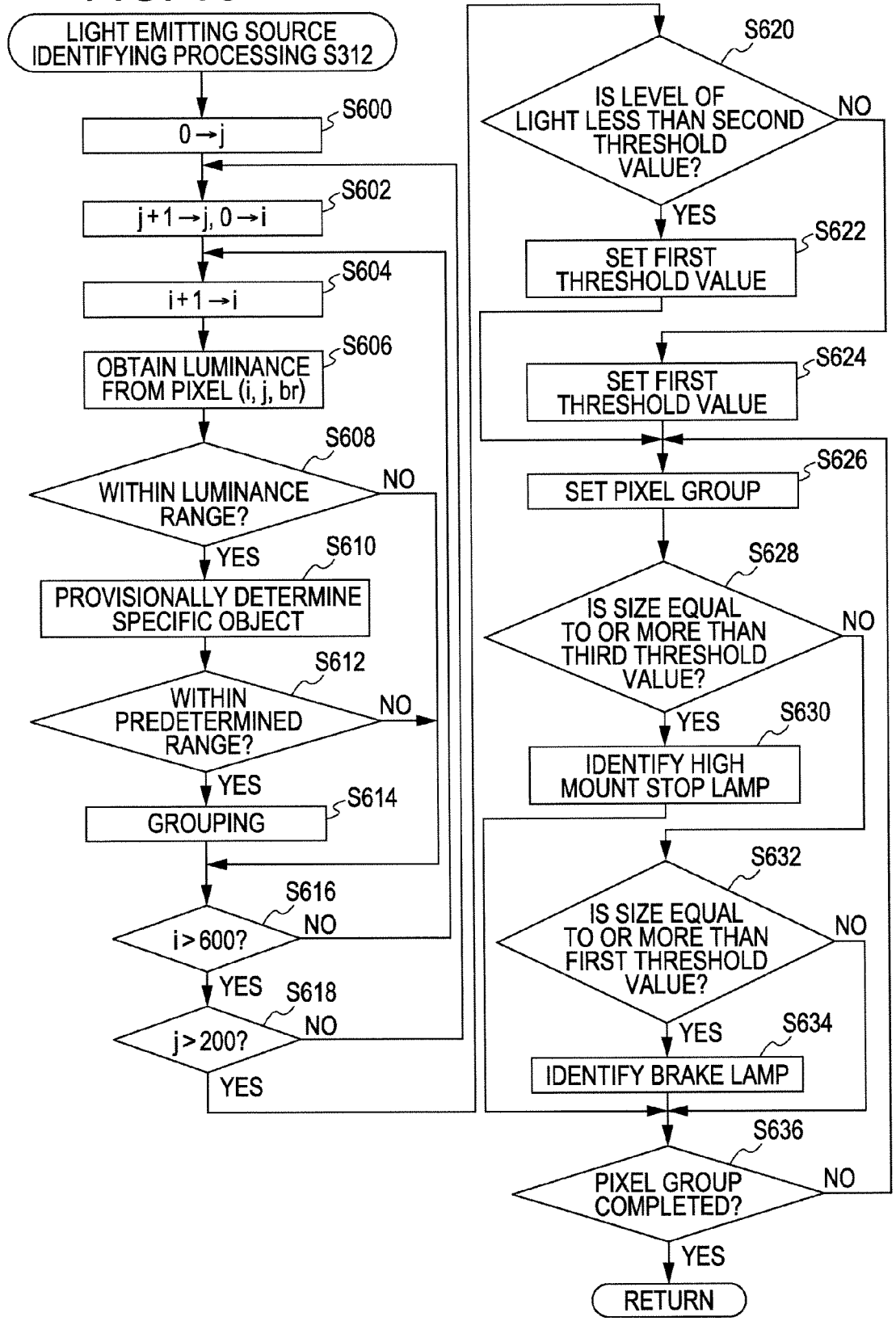

EXTERIOR ENVIRONMENT RECOGNITION DEVICE AND EXTERIOR ENVIRONMENT RECOGNITION METHOD

CROSS-REFERENCE TO RELATED APPLICATIONS

The present application claims priority from Japanese Patent Application No. 2011-251588 filed on Nov. 17, 2011, the entire contents of which are hereby incorporated by reference.

BACKGROUND OF THE INVENTION

1. Field of the Invention

The present invention relates to an exterior environment recognition device and an exterior environment recognition method for recognizing environment outside of a subject vehicle.

2. Description of Related Art

Conventionally, there is known a technique that identifies a target object such as an obstacle and a vehicle located in front of a subject vehicle and avoids a collision against the identified target object (collision avoiding control) and a technique that performs control so as to maintain a safe distance between the subject vehicle and a preceding vehicle (cruise control) (for example, Japanese Patent No. 3349060). In many of these techniques, a preceding vehicle is tracked to update the position information thereof, and calculate the travelling speed and the like of the preceding vehicle. The result of this calculation is used for brake (braking) control and cruise control, for example.

However, it is difficult to smoothly carry out cruise control by simply calculating the behavior of the preceding vehicle. More smooth cruise control can be achieved by, for example, incorporating a human-like processing of viewing and recognizing whether a brake lamp of the preceding vehicle is turned on or not and the like, and predicting deceleration operation of the preceding vehicle.

As such a technique for detecting whether the brake lamp of the preceding vehicle is turned on or not, there is a technique for distinguishing between the brake lamp and the tail lamp on the basis of acceleration/deceleration of the preceding vehicle (for example, Japanese Unexamined Patent Application Publication (JP-A) No. 2005-1425). A technique for detecting a brake lamp in an ON state on the basis of change of luminance or change of the size of a detection area of a tail lamp and determining a deceleration state of a preceding vehicle (for example, Japanese Patent No. 3872179) is also disclosed, and a technique using a histogram distribution of lightness in a red color area to determine whether a brake lamp is turned on by means of standard deviation and the like (for example, JP-A No. 9-267686) is also disclosed.

In the technique of JP-A No. 2005-1425 described above, the brake lamp is distinguished on the basis of the acceleration/deceleration of the preceding vehicle, but the cause of the deceleration may not be necessarily the brake operation. Moreover, it takes some time from when a driver performs brake operation to when the vehicle actually decelerates, and therefore, the brake operation is determined with a delay since the brake lamp is actually turned on. In the technique of Japanese Patent No. 3872179, because the tail lamp is turned on only at night, the difference between the size of area of the tail lamp and the size of area of the brake lamp cannot be always obtained. On the other hand, in JP-A No. 9-267686, when the sunlight is strong, the lightness (luminance) attains the maximum level, and accordingly, the histogram distribution does not change at all. Like this, there is a problem in that the detection processing of the brake lamp may become unstable due to exterior environment.

BRIEF SUMMARY OF THE INVENTION

The present invention is made in view of such problems, and it is an object of the present invention to provide an exterior environment recognition device and an exterior environment recognition method capable of determining whether a light emitting source is turned on or not with a high degree of accuracy.

In order to solve the above problems, an aspect of the present invention provides an exterior environment recognition device that includes: an image obtaining unit for obtaining a first image in a first exposure mode according to a level of light of an exterior environment, and obtaining a second image in a second exposure mode of which exposure time is different from the first exposure mode and which allows determination as to whether a light emitting source is emitting light by itself or not; a vehicle identifying unit for identifying, based on the first image, a vehicle area occupied by a vehicle preceding in a detection area; a light emitting source identifying unit for identifying a position of the light emitting source, based on luminance of the second image; and a position associating unit for associating the position of the light emitting source and the vehicle area.

The light emitting source identifying unit may group, on the basis of a relative distance between pixels which are adopted as candidates of a light emitting source, multiple pixels into one light emitting source candidate, and only when a size of the light emitting source candidate is equal to or more than a first threshold value defined in advance, the light emitting source candidate may be identified as the light emitting source.

Multiple first threshold values may be provided in advance at multiple steps in accordance with the level of light of the exterior environment.

The exterior environment recognition device may further include an arrangement determining unit which determines whether relative arrangement of the position of the light emitting source and the vehicle area associated by the position associating unit is appropriate arrangement or not.

The light emitting source may be at least one of a brake lamp, a high mount stop lamp, a tail lamp, and a turn signal.

The light emitting source includes a brake lamp and a tail lamp, and the exterior environment recognition device may further include a brake lamp identifying unit for identifying the position of the brake lamp, on the basis of relationship in terms of luminance between the brake lamp and the tail lamp and the position of the tail lamp.

In order to solve the above problems, another aspect of the present invention provides an exterior environment recognition method that includes: obtaining a first image in a first exposure mode according to a level of light of an exterior environment, and obtaining a second image in a second exposure mode of which exposure time is different from the first exposure mode and which allows determination as to whether a light emitting source is emitting light by itself or not; identifying, based on the first image, a vehicle area occupied by a vehicle preceding in a detection area; identifying a position of the light emitting source, based on luminance of the second image; and associating the position of the light emitting source and the vehicle area.

According to the present invention, a determination can be made as to whether a light emitting source is turned on or not with a high degree of accuracy, using absolute luminance when the light emitting source is turned on.

BRIEF DESCRIPTION OF THE SEVERAL VIEWS OF THE DRAWINGS

FIG. 15 is a flowchart illustrating a flow of light emitting source identifying processing.

DETAILED DESCRIPTION OF THE INVENTION

Figure 1:
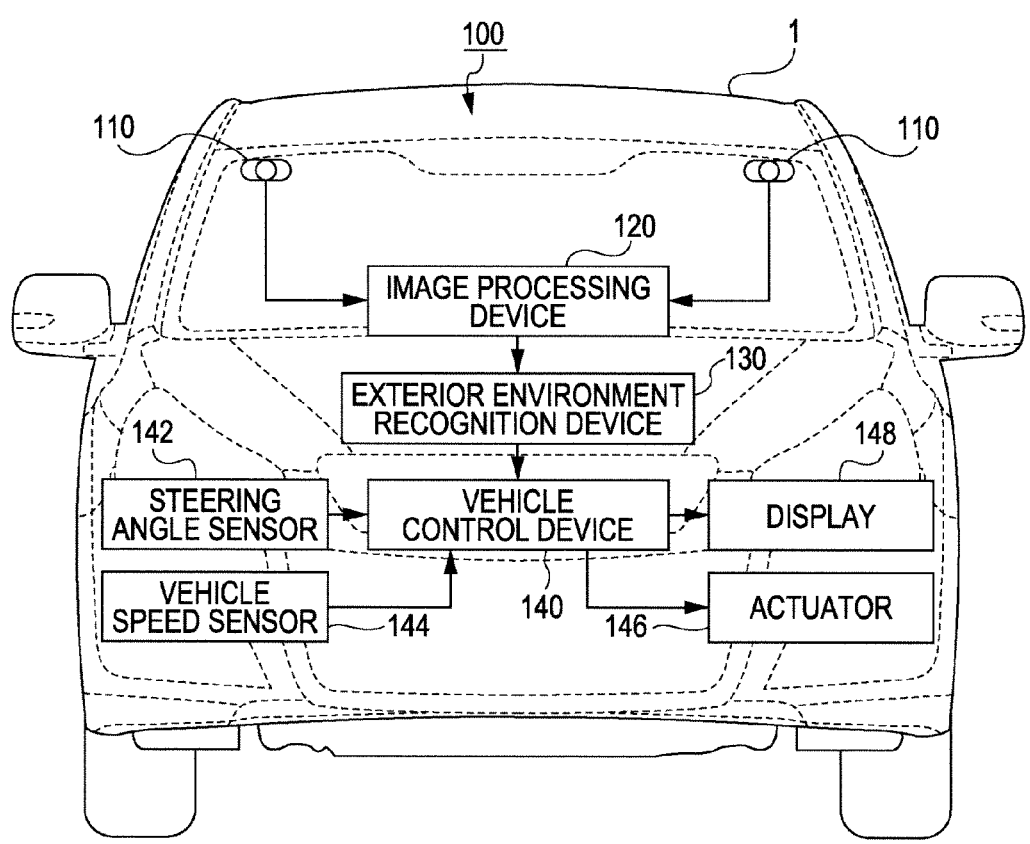
FIG. 1 is a block diagram illustrating a connection relationship in an environment recognition system.

A preferred embodiment of the present invention will be hereinafter explained in detail with reference to attached drawings. The size, materials, and other specific numerical values shown in the embodiment are merely exemplification for the sake of easy understanding of the invention, and unless otherwise specified, they do not limit the present invention. In the specification and the drawings, elements having substantially the same functions and configurations are denoted with the same reference numerals, and repeated explanation thereabout is omitted. Elements not directly related to the present invention are omitted in the drawings.

(Environment Recognition System 100)

FIG. 1 is a block diagram illustrating a connection relationship in an environment recognition system 100. The environment recognition system 100 includes a plurality of imaging devices 110 (two imaging devices 110, in the present embodiment), an image processing device 120, an exterior environment recognition device 130, and a vehicle control device 140 that are provided in a vehicle 1.

The imaging device 110 includes an imaging element such as a CCD (Charge-Coupled Device) and a CMOS (Complementary Metal-Oxide Semiconductor), and can obtain a color image, that is, luminance of three color phases (red, green, blue) in units of pixels. In this case, color images taken by the imaging devices 110 are referred to as luminance images, which are distinguished from a distance image explained later.

The imaging devices 110 are arranged to be spaced apart from each other in a substantially horizontal direction so that optical axes of the two imaging devices 110 are substantially parallel to each other in a proceeding direction of the vehicle 1. The imaging device 110 continuously generates image data obtained by capturing an image of a target object existing in a detection area in front of the vehicle 1 at every 1/60 seconds (60 fps), for example. Each functional unit in the embodiment below performs each processing in response to update of such image data.

Further, in the present embodiment, the imaging device 110 obtains a first image by capturing an image in a detection area in a first exposure mode representing an exposure time and a diaphragm according to a level of light of exterior environment. The imaging device 110 also obtains a second image by capturing an image in the detection area in a second exposure mode of which exposure time is different from that of the first exposure mode, and which allows determination as to whether a particular light emitting source such as a brake lamp is emitting light by itself or not. For example, in the daytime, the exposure time of the second exposure mode is set at a time less than the exposure time of the first exposure mode according to bright exterior environment, or the second image is obtained upon making the diaphragm more strongly limit light. In the present embodiment, the first image and the second image are respectively used as luminance images and distance images. The first exposure mode and the second exposure mode are achieved as follows.

For example, periodical image-capturing timing of the imaging device 110 is divided into time periods, and image-capturing in the first exposure mode and image-capturing in the second exposure mode are alternately performed, whereby the first image and the second image can be obtained successively. In an imaging element provided with two capacitors for each pixel and capable of charging the two capacitors in parallel, two images in different exposure modes can be obtained in parallel by changing the charging times in one exposure. Further, reading process can be performed twice with different times during charging of one capacitor, and the two images in different exposure modes can be obtained in parallel, whereby the above object can be achieved. Alternatively, two sets of imaging devices 110 may be prepared in advance with different exposure modes (in this case, two sets of two imaging devices 110), so that images can be respectively obtained from the two sets of imaging devices 110. The exposure time that dominates the exposure mode is controlled appropriately within a range of, for example, 1 to 60 msec.

In this case, the target object may be not only a vehicle, a traffic light, a road, a guardrail, and the like, which are three-dimensional objects existing independently, but also flashing portions such as a brake lamp (tail lamp), a turn signal, a traffic light, which are things that can be identified as portions of three-dimensional objects. In particular, in the present embodiment, a brake lamp (of which position is equivalent to that of a tail lamp), a high mount stop lamp, a tail lamp, and a turn signal, which are located at the rear portion of the vehicle, will be explained.

The image processing device 120 obtains image data from each of the two imaging devices 110, and derives, based on the two image data, parallax information including parallax of any given block (a set of a predetermined number of pixels) in the image and a screen position representing a position in the screen of any given block. The image processing device 120 derives parallax using so-called pattern matching for searching a block corresponding to any given block extracted from one of the image data (for example, an array including four pixels in the horizontal direction and four pixels in the vertical direction) from the other image data. In this case, "horizontal" used in the explanation about the block means a horizontal direction of the screen of the captured image, and this corresponds to the horizontal direction in the real world. On the other hand, "vertical" means a vertical direction of the screen of the captured image, and this corresponds to the vertical direction in the real world.

This pattern matching may be done by comparing luminance values (Y color difference signals) between two image data in unit of block indicating any image position. Examples include methods such as an SAD (Sum of Absolute Difference) obtaining a difference of luminance values, an SSD (Sum of Squared intensity Difference) squaring a difference and using the squared difference, and an NCC (Normalized Cross Correlation) adopting the degree of similarity of dispersion values obtained by subtracting a mean value from a luminance value of each pixel. The image processing device 120 performs such parallax deriving processing in units of blocks on all the blocks appearing in the detection area (for example, 600 pixels×200 pixels). In this case, the block is assumed to include 4 pixels×4 pixels, but the number of pixels in the block may be set at any value.

Although the image processing device 120 can derive parallax for each block serving as a detection resolution unit, it is impossible to recognize what kind of target object the block belongs to. Therefore, the parallax information is not derived in units of target objects, but is independently derived in detection resolution units (for example, in units of blocks) in the detection area. In this case, an image obtained by associating the parallax information thus derived (corresponding to relative distance explained later) with image data is referred to as a distance image.

Figure 2A:
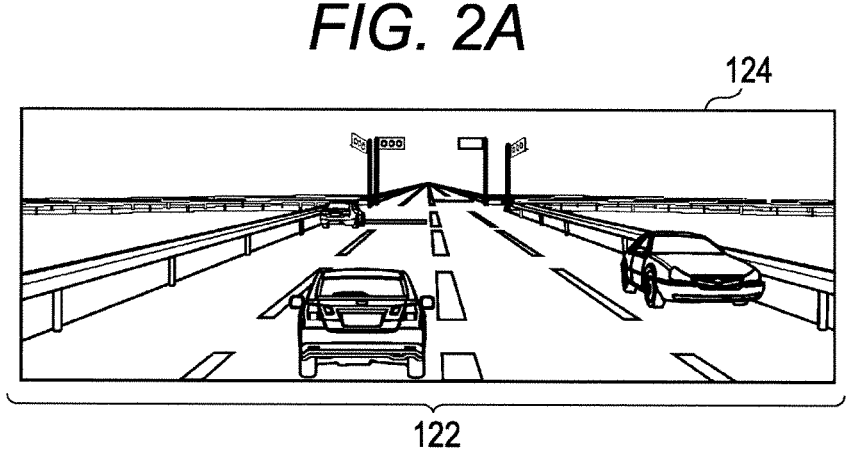
FIGS. 2A and 2B are explanatory diagrams for explaining a luminance image and a distance image.
Figure 2B:
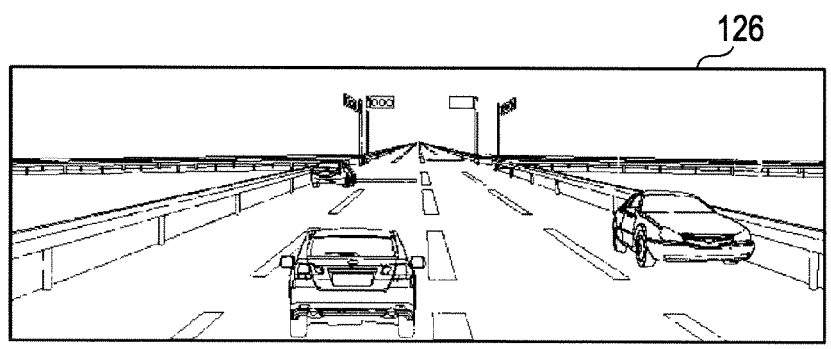

FIGS. 2A and 2B are explanatory diagrams for explaining a luminance image 124 and a distance image 126. For example, it is assumed that the luminance image (image data) 124 as shown in FIG. 2A is generated with regard to a detection area 122 by the two imaging devices 110. In this case, for the sake of easy understanding, only one of the two luminance images 124 is schematically shown. The image processing device 120 obtains parallax for each block from such luminance image 124, and forms the distance image 126 as shown in FIG. 2B. Each block of the distance image 126 is associated with parallax of the block. In this case, for the sake of explanation, a block of which parallax is derived is indicated by a black dot.

The parallax can be easily specified at an edge portion (portion where there is contrast between adjacent pixels) of an image, and therefore, the block from which parallax is derived, which is denoted with black dots in the distance image 126, is likely to also be an edge in the luminance image 124. Therefore, the luminance image 124 as shown in FIG. 2A and the distance image 126 as shown in FIG. 2B are similar in terms of outline of each target object. In the present embodiment, the luminance image 124 and the distance image 126 as described above are respectively generated on the basis of the first image and the second image. Therefore, in the present embodiment, the following images are used: the luminance image 124 based on the first image, the distance image 126 based on the first image, the luminance image 124 based on the second image, and the distance image 126 based on the second image.

The exterior environment recognition device 130 obtains the luminance image 124 and the distance image 126 on the first image and the second image from the image processing device 120, and identifies which specific object the target object in the detection area corresponds to, from the luminance in the luminance image 124 and the relative distance from the subject vehicle derived from the distance image 126. For example, a preceding vehicle is identified using the relative distance and the like, and further, by identifying the brake lamp of the preceding vehicle using the luminance, the vehicle having the brake lamp can be recognized more accurately. By doing so, deceleration of the vehicle can be quickly found on the basis of the brake lamp, and this can be used for collision avoiding control and cruise control.

It should be noted that the above relative distance can be obtained by converting parallax information for each block in the distance image 126 into three-dimensional position information using a so-called stereo method. In this case, the stereo method is a method using triangulation method to derive the relative distance of the target object with respect to the imaging device 110 from the parallax of the target object. Processing performed by the exterior environment recognition device 130 will be explained later in detail.

The vehicle control device 140 avoids collision with the target object identified by the exterior environment recognition device 130 and perform control so as to maintain a safe distance between the subject vehicle and the preceding vehicle. More specifically, the vehicle control device 140 obtains the current cruising state of the vehicle 1 by way of, e.g., a steering angle sensor 142 for detecting the angle of steering and a vehicle speed sensor 144 for detecting the speed of the vehicle 1, thereby controlling an actuator 146 to maintain a safe distance between the subject vehicle and the preceding vehicle. In this case, the actuator 146 is an actuator for vehicle control used to control the brake, the throttle valve, the steering angle and the like. When collision with a target object is expected, the vehicle control device 140 displays warning (notification) to that effect on a display 148 provided in front of the driver, and controls the actuator 146 to automatically decelerate the vehicle 1. The vehicle control device 140 can also be integrally formed with the exterior environment recognition device 130.

(Exterior Environment Recognition Device 130)

Figure 3:
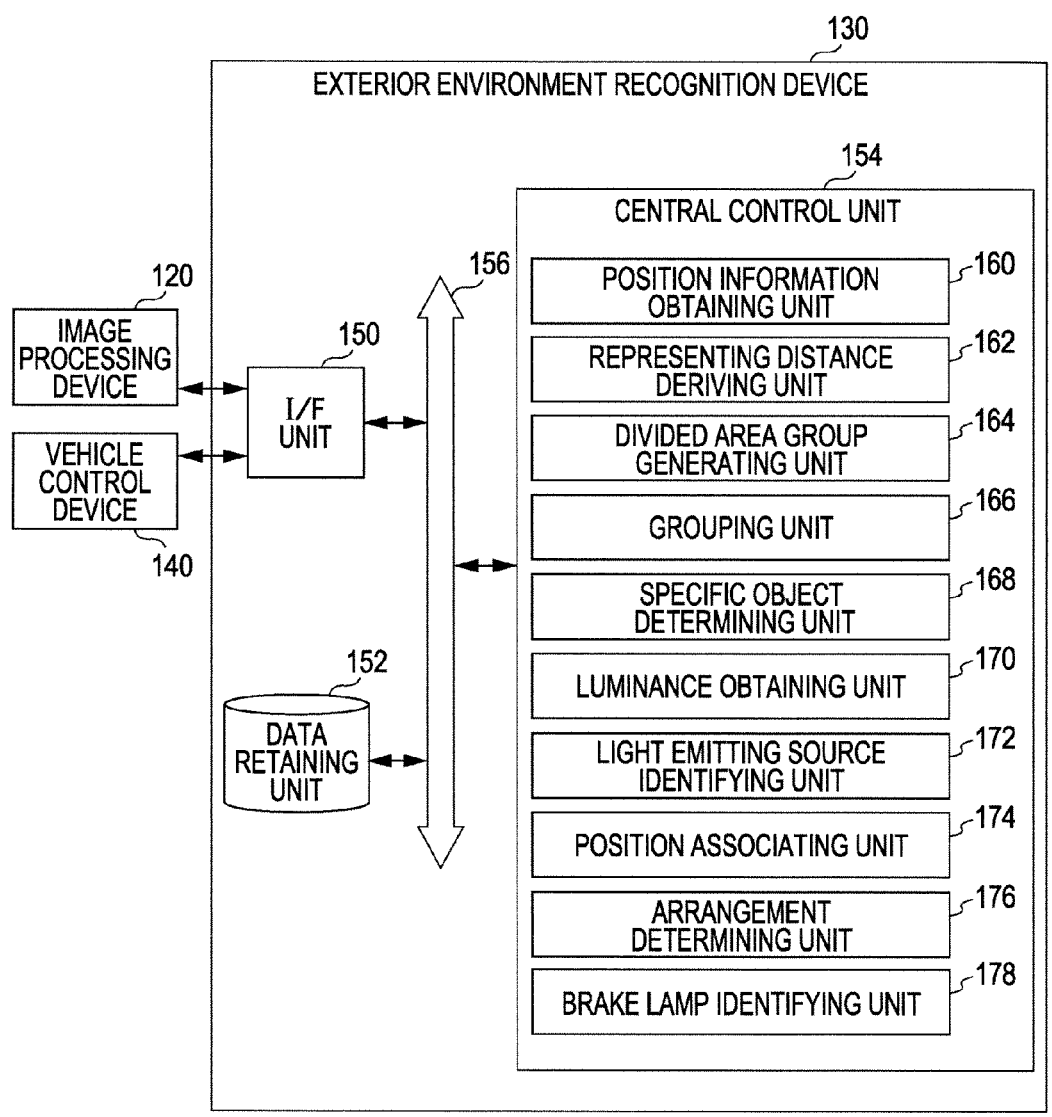
FIG. 3 is a functional block diagram schematically illustrating functions of an exterior environment recognition device.

FIG. 3 is a functional block diagram schematically illustrating functions of the exterior environment recognition device 130. As shown in FIG. 3, the exterior environment recognition device 130 includes an I/F unit 150, a data retaining unit 152, and a central control unit 154.

The I/F unit 150 is an interface for interactive information exchange with the image processing device 120 and the vehicle control device 140. The I/F unit 150 functions as an image obtaining unit. The data retaining unit 152 is constituted by a RAM, a flash memory, an HDD and the like, and retains a specific object table (association) and various kinds of information required for processing performed by each functional unit explained below. In addition, the data retaining unit 152 temporarily retains the luminance image 124 and the distance image 126 based on the first image and the second image received from the image processing device 120. In this case, the specific object table is used as follows.

Figures 4, 5:
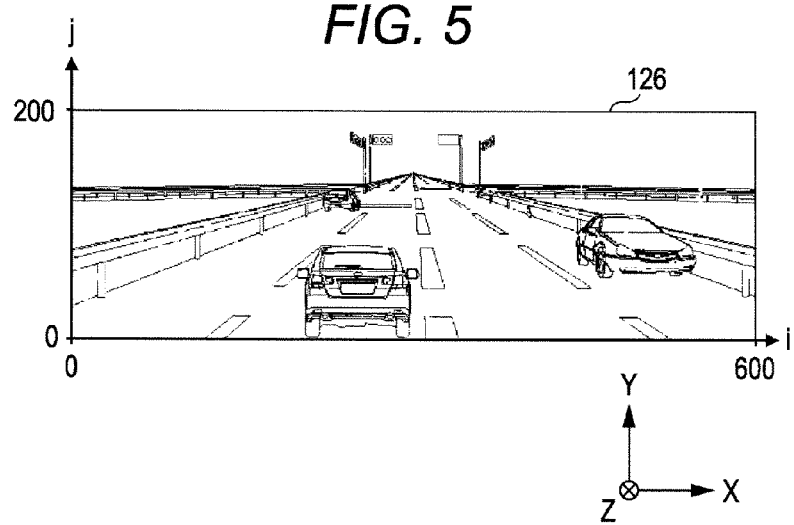
FIG. 4 is an explanatory diagram for explaining a specific object table.
FIG. 5 is an explanatory diagram for explaining conversion into three-dimensional position information performed by a position information obtaining unit.

FIG. 4 is an explanatory diagram for explaining a specific object table 200. In the specific object table 200, a plurality of specific objects are associated with a luminance range 202 indicating a range of luminance, a height range 204 indicating a range of height from the road surface, a width range 206 of a horizontal distance of the specific object, a width range 208 of a vertical distance of the specific object, a difference 210 of the horizontal distance from the same specific object, a difference 212 of the vertical distance from the same specific object, and a size ratio 214 of the same specific object. In this case, the specific objects are assumed to be various objects required to identify a vehicle, such as "brake lamp (red)", "high mount stop lamp (red)", "tail lamp (red)", and "turn signal (orange)". It is to be understood that the specific object is not limited to what have been described in FIG. 4. Among the specific objects, for example, a specific object "brake lamp (red)" is associated with luminance range (R) "200 or more", luminance range (G) "50 or less", luminance range (B) "50 or less", height range "0.3 to 2.0 m", width range of the horizontal distance "0.05 to 0.2 m", width range of the vertical distance "0.05 to 0.2 m", difference of the horizontal distance "1.4 to 1.9 m", difference of the vertical distance "0.3 m or less", and size ratio "50 to 200%".

The central control unit 154 is made of a semiconductor integrated circuit including, e.g., a central processing unit (CPU), a ROM storing programs and the like, and a RAM serving as a work area, and controls the I/F unit 150 and the data retaining unit 152 by way of a system bus 156. In the present embodiment, the central control unit 154 also functions as a position information obtaining unit 160, a representing distance deriving unit 162, a divided area group generating unit 164, a grouping unit 166, a specific object determining unit 168, a luminance obtaining unit 170, a light emitting source identifying unit 172, a position associating unit 174, an arrangement determining unit 176, and a brake lamp identifying unit 178.

The position information obtaining unit 160, the representing distance deriving unit 162, the divided area group generating unit 164, the grouping unit 166, and the specific object determining unit 168 also function as a vehicle identifying unit for identifying a vehicle area, occupied by a vehicle running in front of the subject vehicle, within the detection area on the basis of the first image.

The position information obtaining unit 160 uses the stereo method to convert parallax information for each block in the detection area 122 of the distance image 126 based on the first image into three-dimensional position information including a horizontal distance x, a height y, and a relative distance z. In this case, the parallax information represents parallax of each block in the distance image 126, whereas the three-dimensional position information represents information about the relative distance of each block in the real world. When the parallax information is not derived in units of pixels but is derived in units of blocks, that is, in units of a plurality of pixels, calculation may be executed in units of pixels with the parallax information being deemed as parallax information about all the pixels which belong to a block.

FIG. 5 is an explanatory diagram for explaining conversion into three-dimensional position information by the position information obtaining unit 162. First, the position information obtaining unit 162 recognizes the distance image 126 as a coordinate system in units of pixels as shown in FIG. 5. In this case, in FIG. 5, the lower left corner is adopted as an origin (0, 0). The horizontal direction is adopted as an i coordinate axis, and the vertical direction is adopted as a j coordinate axis. Therefore, a pixel having a parallax dp can be represented as (i, j, dp) using a pixel position i, j and the parallax dp.

The three-dimensional coordinate system in the real world according to the present embodiment will be considered using a relative coordinate system in which the vehicle 1 is located in the center. In this case, the right side of the direction in which the vehicle 1 moves is denoted as a positive direction of X axis, the upper side of the vehicle 1 is denoted as a positive direction of Y axis, the direction in which the vehicle 1 moves (front side) is denoted as a positive direction of Z axis, and the crossing point between the road surface and the vertical line passing through the center of two imaging devices 110 is denoted as an origin (0, 0, 0). At this occasion, when the road is assumed to be a flat plane, the road surface matches the X-Z plane (y=0). The position information obtaining unit 160 uses (numerical expression 1) to (numerical expression 3) shown below to transform the coordinate of the block (i, j, dp) in the distance image 126 into a three-dimensional point (x, y, z) in the real world.

$$x = CD/2 + z \cdot PW \cdot (i - IV) \quad \text{(numerical expression 1)}$$

$$y = CH + z \cdot PW \cdot (j - JV) \quad \text{(numerical expression 2)}$$

$$z = KS/dp \quad \text{(numerical expression 3)}$$

Here, CD denotes an interval (baseline length) between the imaging devices 110, PW denotes a corresponding distance in the real world to a distance between adjacent pixels in the image, so-called like an angle of view per pixel, CH denotes an arrangement height of the imaging device 110 from the road surface, IV and JV denote coordinates (pixels) in the image at an infinity point in front of the vehicle 1, and KS denotes a distance coefficient (KS=CD/PW).

Therefore, the position information obtaining unit 160 derives the height from the road surface on the basis of the relative distance of the block, and the detection distance (for example, the number of pixels) in the distance image 126 between the point on the road surface located at the relative distance from the block and the block.

First, the representing distance deriving unit 162 divides the detection area 122 of the distance image 126 into multiple divided areas 216 in the horizontal direction. Subsequently, for blocks located above the road surface, the representing distance deriving unit 162 generates a histogram by adding relative distances included in each of predetermined distances used for classification, for each divided area on the basis of the position information. Then, the representing distance deriving unit 162 derives a representing distance which corresponds to the peak of the added distance distribution. In this case, "correspond to the peak" means a peak value or a value close to the peak that satisfies any given condition.

Figure 6A:
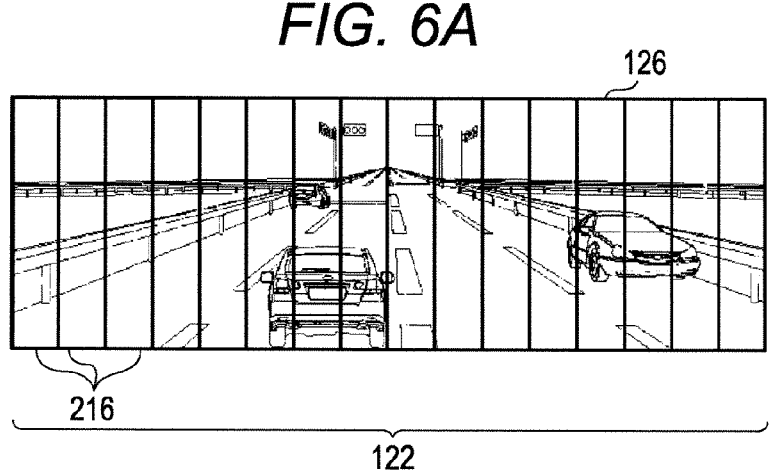
FIGS. 6A and 6B are explanatory diagrams for explaining a divided area and a representing distance.
Figure 6B:
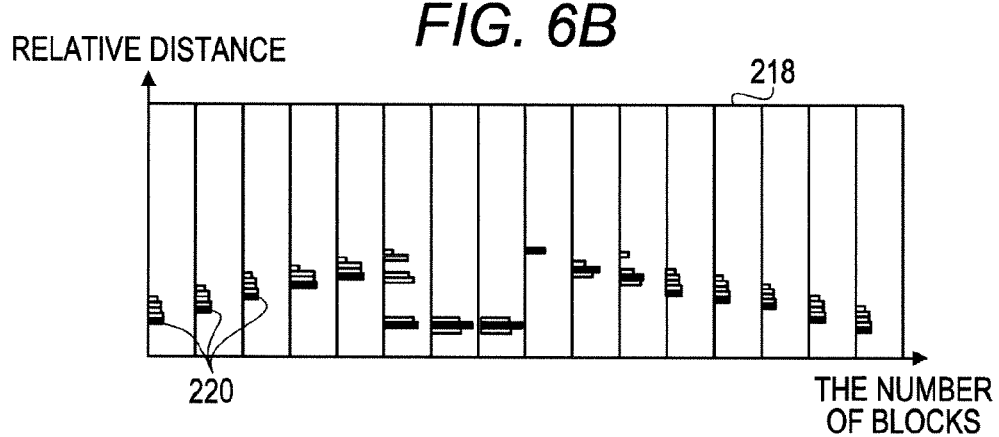

FIGS. 6A and 6B are explanatory diagrams for explaining divided area 216 and the representing distance 220. As shown in FIG. 5, when the distance image 126 is divided into multiple areas in the horizontal direction, the divided area 216 is made into a rectangular shape as shown in FIG. 6A. In the divided area 216 in the rectangular shape as described above, for example, 150 columns each having a horizontal width of four pixels are originally arranged. However, in this explanation, the detection area 122 is equally divided into sixteen areas for the sake of explanation.

Subsequently, in each divided area 216, the representing distance deriving unit 162 refers to the relative distances of all the blocks, and when a histogram (which is shown as a horizontally long rectangle (bar) in FIG. 6B) is generated, a distance distribution 218 as shown in FIG. 6B is obtained. In this case, the vertical direction indicates the predetermined distances used for classification, and the horizontal direction indicates the number of blocks of which relative distance is included in each of predetermined distances used for classification. However, FIG. 6B is a virtual screen only for calculation, and a visual screen is not actually generated. Then, the representing distance deriving unit 162 refers to the distance distribution 218 thus derived, and identifies the representing distance which is the relative distance corresponding to the peak (which is shown by rectangles filled in black in FIG. 6B) 220.

The divided area group generating unit 164 successively compares the representing distance 220 between adjacent divided areas 216, and groups divided areas 216 of which representing distance 220 is close (for example, located at 1 m or less), thus generating one or more divided area groups. At this occasion, when 3 or more divided areas 216 have close representing distances 220, all the continuous divided areas 216 are made into a divided area group.

Figure 7:
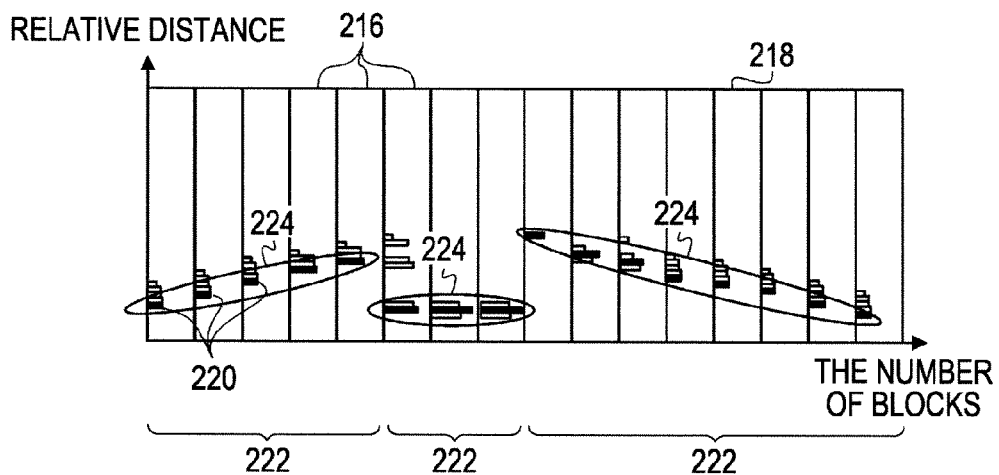
FIG. 7 is an explanatory diagram for explaining a divided area group.

FIG. 7 is an explanatory diagram for explaining the divided area group 222. The divided area group generating unit 164 compares the divided areas 216 with each other, and groups the representing distances 220 as shown in FIG. 7 (a virtual group 224 after the grouping). With such grouping, the divided area group generating unit 164 can identify a three-dimensional object located above the road surface. In addition, the divided area group generating unit 164 can recognize, on the basis of change of a relative distance in the horizontal direction and the vertical direction in the divided area group 222 thus grouped, as to whether the object is either a rear portion or a side portion of a preceding vehicle or a structure provided along a road such as a guardrail.

The grouping unit 166 performs grouping process in such a manner that a block of which relative distance z corresponds to the representing distance 220 within the divided area group 222 is adopted as a base point, and this block and a block of which difference of horizontal distance x from the base point, of which difference of a height y from the base point, and of which difference of relative distance z from the base point are within a predetermined range (for example, 0.1 m) are assumed to correspond to the same specific object. The range is represented as a distance in the real world, and can be set at any given value by a manufacturer and a driver. The grouping unit 166 also groups blocks which are newly added by grouping process, such that the grouping unit 166 further groups blocks of which difference of the horizontal distance x from the block serving as the base point, of which difference of the height y from the block serving as the base point, and of which difference of the relative distance z from the block serving as the base point are within a predetermined range. As a result, all the blocks that can be assumed to be the same specific object are grouped.

In this case, each of the difference of the horizontal distance x, the difference of the height y, and the difference of the relative distance z is independently determined, and only when all of them are included within the predetermined range, the target portions are grouped into the same group. However, this may be done by other calculations. For example, when Euclidean distance, square root of ((difference of horizontal distance x)2+(difference of height y)2+(difference of relative distance z)2), is included within a predetermined range, the target portions may be grouped into the same group. With such calculation, the distance between blocks in the real world can be derived accurately, and therefore, the accuracy of grouping can be enhanced.

As long as the block group made into the group by the grouping unit 166 satisfy a predetermined condition, the specific object determining unit 168 determines that the target objects are a specific object. For example, when the grouped block group is located on the road, the specific object determining unit 168 determines whether the size of the entire block group corresponds to the size of a specific object "vehicle". When the specific object determining unit 168 determines that the size of the entire block group corresponds to the size of the specific object "vehicle", the specific object determining unit 168 determines that the block group is the specific object "vehicle". In this case, a area of the screen occupied by the block group identified as the specific object "vehicle" is called a vehicle area in particular.

In this manner, the exterior environment recognition device 130 can extract one or more block groups as specific objects from the distance image 126 serving as the first image, and the information can be used for various kinds of controls. For example, when any given block group in the detection area is determined to be a vehicle, it is possible to avoid collision with the identified vehicle (preceding vehicle), and it is possible to perform control so as to maintain a safe distance between the subject vehicle and the preceding vehicle. Hereinafter, processing using the second image for more quickly identifying the preceding vehicle and finding the behavior of the preceding vehicle in this manner will be explained.

In accordance with a control command given by the light emitting source identifying unit 172 explained later, the luminance obtaining unit 170 obtains luminance in units of pixels (luminance of three color phase (R, G, B) in units of pixels) from the luminance image 124 based on the second image. At this occasion, when it is, for example, rainy or cloudy in the detection area, the luminance obtaining unit 170 may obtain the luminance upon adjusting the white balance so as to obtain the original luminance.

The light emitting source identifying unit 172 identifies the position of a predetermined light emitting source on the basis of the specific object table 200 retained in the data retaining unit 152 and luminance of each pixel of the luminance image 124 based on the second image. More specifically, first, the light emitting source identifying unit 172 causes the luminance obtaining unit 170 to obtain the luminance of any given pixel in the luminance image 124 based on the second image. Subsequently, the light emitting source identifying unit 172 selects a particular light emitting source associated with the second exposure mode (in this case, "brake lamp") from specific objects registered in the specific object table 200, and determines whether the luminance of a pixel obtained is included in the luminance range 202 of the selected specific object. Then, when the luminance is determined to be included in the target luminance range 202, the pixel is provisionally determined as the specific object.

As explained above, the second image is an image obtained by capturing an image in the second exposure mode in which it is possible to determine whether a particular light emitting source such as "brake lamp" is emitting light by itself or not. A thing that emits light by itself such as a "brake lamp" provides high level of luminance regardless of the level of light of a sun and a streetlamp. In particular, the level of light of the "brake lamp" is generally defined by laws and regulations, and therefore, by capturing an image in the exposure mode in which only predetermined level of light can be exposed (for example, exposure in a short time), only pixels corresponding to "brake lamp" can be easily extracted.

Figure 8A:
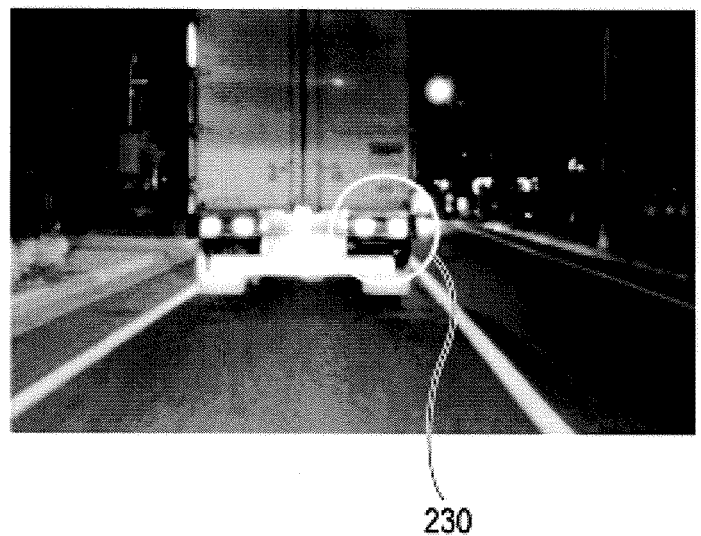
FIGS. 8A and 8B are explanatory diagrams for explaining difference between image-capturing in a first exposure mode and image-capturing in a second exposure mode.
Figure 8B:
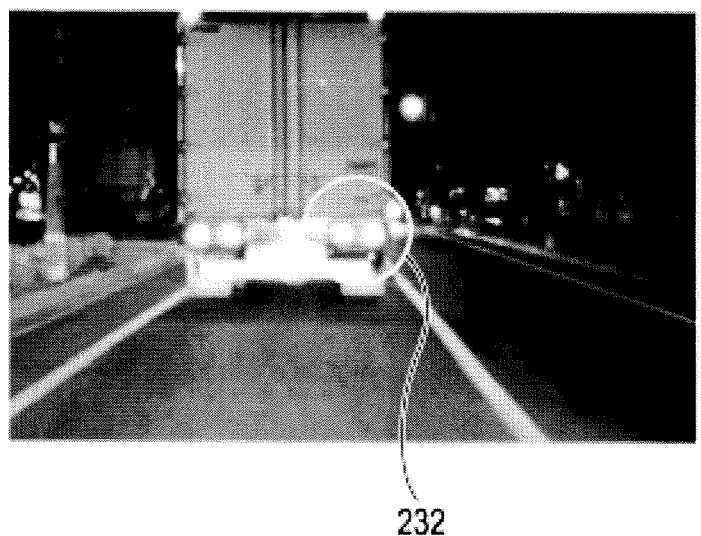

FIGS. 8A, 8B, 9A, and 9B are explanatory diagrams for explaining difference between image-capturing in the first exposure mode and image-capturing in the second exposure mode. FIGS. 8A and 8B illustrate the first image in the first exposure mode. In particular, in FIG. 8A, a tail lamp is turned on, and in FIG. 8B, a brake lamp is turned on. As can be understood by comparing FIGS. 8A and 8B, in the first exposure mode according to the level of light in the exterior environment, hardly any luminance difference is found between the luminance at a tail lamp position 230 when the tail lamp is turned on (that is, when the brake lamp is not turned on) and the luminance at a brake lamp position 232 when the brake lamp is turned on. This is because, in the first exposure mode of which exposure time is long, the luminance of all the RGB components of both of tail lamp and the brake lamp are saturated.

Figure 9A:
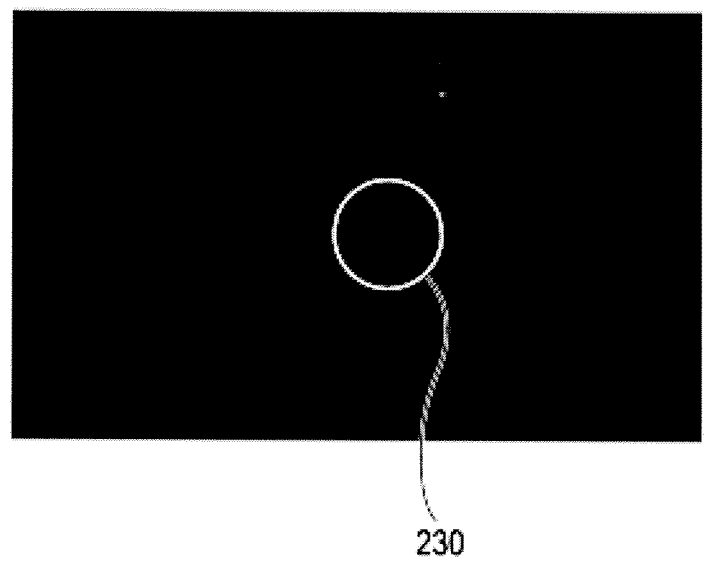
FIGS. 9A and 9B are explanatory diagrams for explaining difference between image-capturing in the first exposure mode and image-capturing in the second exposure mode.
Figure 9B:
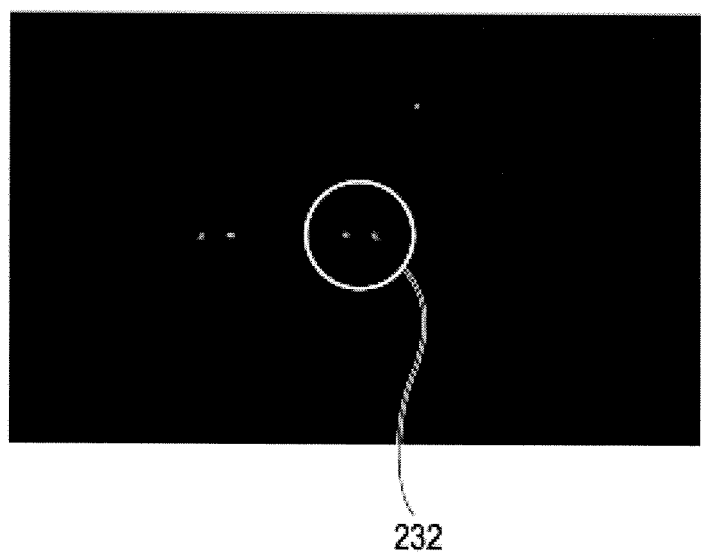

FIGS. 9A and 9B illustrate the second image in the second exposure mode. In particular, in FIG. 9A, a tail lamp is turned on, and in FIG. 9B, a brake lamp is turned on. In the second exposure mode, only the luminance can be obtained when the brake lamp is turned on. Therefore, as can be understood by comparing FIGS. 9A and 9B, hardly any luminance equivalent to the level of light at the tail lamp position 230 can be obtained when the tail lamp is turned on (that is, when the brake lamp is not turned on), and clearly high level of luminance is obtained at the brake lamp position 232 when the brake lamp is turned on.

In the second exposure mode, the luminance of the brake lamp is preferably set at such an exposure time at which the R component is on the verge of saturation in the imaging element. The imaging device 110 usually has a much smaller dynamic range than a human, and therefore, when an image is captured in the first exposure mode with a lightness of about evening level, the luminance of the brake lamp is relatively high with respect to the exterior environment. Then, not only the R component but also the G component and the B component overlapping the R component are saturated at the maximum luminance (for example, luminance 255), and the pixels become white. Accordingly, the second exposure mode is configured such that, when the brake lamp is turned on, the exposure time is set so that the R component is on the verge of saturation, so that regardless of the external environment, the luminance of the G component and the B component is suppressed, and only the R component is extracted at the maximum luminance. In this manner, for example, the difference between the brake lamp and the tail lamp can be ensured as much as possible.

More specifically, when there is a preceding vehicle when driving at night, light of which level is as low as a tail lamp (for example, approximately, luminance range (R) "50", luminance range (G) "50", luminance range (B) "50") will not be displayed on the second image. In contrast, when the brake lamp is ON, as shown in the specific object table 200 of FIG. 4, the luminance range 202 is as follows: the luminance range (R) is "200 or more", the luminance range (G) is "50 or less", and the luminance range (B) is "50 or less". Therefore, even when an image is captured in the second exposure mode, the second image is displayed in such a manner that the position thereof can be understood. As described above, the light emitting source identifying unit 172 can identify only predetermined light emitting sources such as a brake lamp by using the second image. In this case, the exposure time is fixed in the second exposure mode. Alternatively, the exposure time may be adjusted automatically in accordance with exterior environment or in accordance with driver's operation.

When the difference of the horizontal distance x between pixels which are adopted as a candidate of a light emitting source, the difference of the height y therebetween, and the difference of the relative distance z therebetween is within a predetermined range, the light emitting source identifying unit 172 groups the multiple pixels into one light emitting source candidate. As described above, even when there are multiple pixels constituting the brake lamp, or even when each of the right and left brake lamp of the vehicle 1 is constituted by multiple lamps, this can be recognized as one of the brake lamps which are distinguished as the right and left lamps.

Only when the size of the light emitting source candidate is equal to or more than a first threshold value defined in advance (for example, horizontal and vertical widths of 0.05 m), the light emitting source identifying unit 172 identifies the light emitting source candidate as the light emitting source. It should be noted that the light emitting source identifying unit 172 may use, as a condition, not only the size but also the shape of the light emitting source candidate. For example, when the brake lamp is in a shape extending in the vertical direction at the right and left end portions of the vehicle rear portion, the light emitting source identifying unit 172 determines not only the size thereof but also that it has a shape that can be deemed as brake lamps. In this manner, desired light emitting source such as brake lamps can be extracted by eliminating light emitting sources corresponding to noise which should not be essentially deemed as predetermined light emitting sources, and this makes it possible to identify specific objects with a high degree of accuracy.

Further, multiple first threshold values may be provided in advance at multiple steps in accordance with the level of light of the exterior environment. For example, when the level of light of the exterior environment is less than the second threshold value (for example, luminance of 200), 0.05 m is used as the first threshold value, and when the level of light of the exterior environment is equal to or more than the second threshold value, 0.1 m (which is determined to be more than 0.05 m) is used as the first threshold value. Therefore, when the level of light of the exterior environment obtained by means of an illumination meter and the like is less than the second threshold value defined in advance, the light emitting source identifying unit 172 identifies the light emitting source only if the size of the light emitting source candidate is equal to or more than the first threshold value (0.05 m). When the level of light of the exterior environment is equal to or more than the second threshold value defined in advance, the light emitting source identifying unit 172 identifies the light emitting source only if the size of the light emitting source candidate is equal to or more than the first threshold value (0.1 m). When the level of light of the exterior environment is extremely strong due to solar light and the like, luminance equivalent to the brake lamp may be partially detected by, for example, a mere reflection of solar light incident upon the cover of the red color of the brake lamp even if the brake lamp is turned off. In this case, even in the second exposure mode, the brake lamp in the OFF state may be falsely recognized as a brake lamp in ON state, and therefore, when the level of light of the exterior environment is equal to or more than the second threshold value defined in advance, the light emitting source identifying unit 172 applies a stricter condition of the magnitude, e.g., the condition of the magnitude is changed from 0.05 m to 0.1 m, so that even if a candidate that should not be essentially recognized as a brake lamp is extracted, the candidate is excluded.

In addition, the light emitting source identifying unit 172 can detect not only the brake lamp but also a high mount stop lamp. The high mount stop lamp is a lamp provided at a position higher than the brake lamp, but the high mount stop lamp does not function as a tail lamp unlike the brake lamp. Therefore, by detecting the high mount stop lamp, the accuracy of detection of the brake lamp can be enhanced. At this occasion, the light emitting source identifying unit 172 may identify the light emitting source candidate as a high mount stop lamp only when the size of the light emitting source candidate is equal to or more than a third threshold value (for example, 0.1 m) defined in advance. The high mount stop lamp will be explained later in detail.

As described above, using the light emitting source identifying unit 172, only the brake lamp and the high mount stop lamp can be detected with a high degree of accuracy. However, with only the second image in the second exposure mode, the luminance of the entire detection area 122 is reduced (becomes dark) at night, for example. As a result, nothing can be found except the brake lamp. For this issue, the first image in the first exposure mode explained above is also used to identify the "vehicle" serving as the specific object, which is used in conjunction with the position of the brake lamp.

The position associating unit 174 associates the vehicle area grouped as the specific object "vehicle" by the specific object determining unit 168 with the positions of the brake lamps and the high mount stop lamp which are light emitting sources. This clarifies the relationship in terms of positions between the external periphery of the preceding vehicle and the brake lamps and the high mount stop lamp of the vehicle.

The arrangement determining unit 176 identifies a combination of two pairs of brake lamps which are provisionally determined to exist in the same preceding vehicle, and determines, on the basis of the specific object table 200 as shown in FIG. 4, as to whether the relative arrangement of the position of the vehicle area and the positions of the brake lamps which are the light emitting sources associated by the position associating unit 174 is in an appropriate arrangement or not. For example, the arrangement determining unit 176 determines whether the brake lamp satisfies, by itself, the following condition: the height range is "0.3 to 2.0 m", the width range of the horizontal distance is "0.05 to 0.2 m", and the width range of the vertical distance is "0.05 to 0.2 m". Further, the arrangement determining unit 176 determines whether the combination of two pairs of brake lamps satisfy the following condition: the difference of the horizontal distance is "1.4 to 1.9 m", the difference of the vertical distance is "0.3 m or less", and the size ratio is "50 to 200%". When such condition is satisfied, the brake lamps of the preceding vehicle are determined to be turned on. As described above, in this configuration in which the brake lamps are formally identified only when the light emitting sources provisionally determined to be the brake lamps correspond to the appropriate positions of the vehicle, a single light emitting source emitting light with the same level of light such as a rear fog lamp is prevented from being falsely recognized.

However, when the light emitting source identifying unit 172 detects a high mount stop lamp, the arrangement determining unit 176 recognizes that the preceding vehicle is a vehicle having a high mount stop lamp, and thereafter determines whether the brake lamps are turned on or not in view of the relative arrangement of the high mount stop lamp. For example, when the high mount stop lamp is located above the two pairs of brake lamps and when the distances between the high mount stop lamp and the two pairs of brake lamps are the same, the high mount stop lamp is also treated the same as the brake lamp. Even when the brake lamps are turned off but the tail lamp is turned on, a certain level of luminance is recognized at the positions. However, the high mount stop lamp is turned on only during brake operation, and therefore, the high mount stop lamp allows more reliable determination of brake operation than the brake lamps. Therefore, when the vehicle is once determined to have the high mount stop lamp, but the high mount stop lamp is not detected, the arrangement determining unit 176 determines that the brake lamps are not turned on. In this manner, whether the brake lamps are turned on or not can be identified with a higher degree of accuracy.

When the light emitting source identifying unit 172 does not identify the brake lamps, the brake lamp identifying unit 178 uses the luminance image 124 based on the first image to identify the positions of the brake lamps on the basis of the relationship in terms of luminance between the brake lamps and the tail lamps and on the basis of the positions of the tail lamps. More specifically, first, the brake lamp identifying unit 178 detects the positions of the tail lamps by identifying a portion, where the R component is relatively high and the luminance is high, of the vehicle area of the luminance image 124 based on the first image. Then, the brake lamp identifying unit 178 uses the position information of the tail lamps, and only when there is increase in the luminance values of the positions of the tail lamps in the luminance image 124 based on the second image, the brake lamp identifying unit 178 determines that the brake lamps are turned on. In such configuration, the brake lamp identifying unit 178 can appropriately determine that the brake lamps are turned on even when, for example, one of the combination of the brake lamps malfunctions, and only one image of a brake lamp can be obtained, or even when the vehicle such as a motorcycle has only one brake lamp.

In this case, it is necessary to identify, in advance, the positions of the tail lamps while the brake lamps are not turned on. In the daytime, a portion of the vehicle where the R component is relatively high is identified as a brake lamp candidate. At night, a portion where the luminance of all of RGB are saturated at the maximum value is identified as a brake lamp candidate. Then, the brake lamp identifying unit 178 constantly monitors the position of the tail lamp in the second image, and detects change of the luminance between multiple frames, for example, change from R luminance 50 (tail lamp) to R luminance 200 (brake lamp). However, this function may not be sufficiently achieved, e.g., it is difficult to support a preceding vehicle in red color in the day time. Therefore, this is preferably used as an auxiliary logic.

(Exterior Environment Recognition Method)

Figure 10:
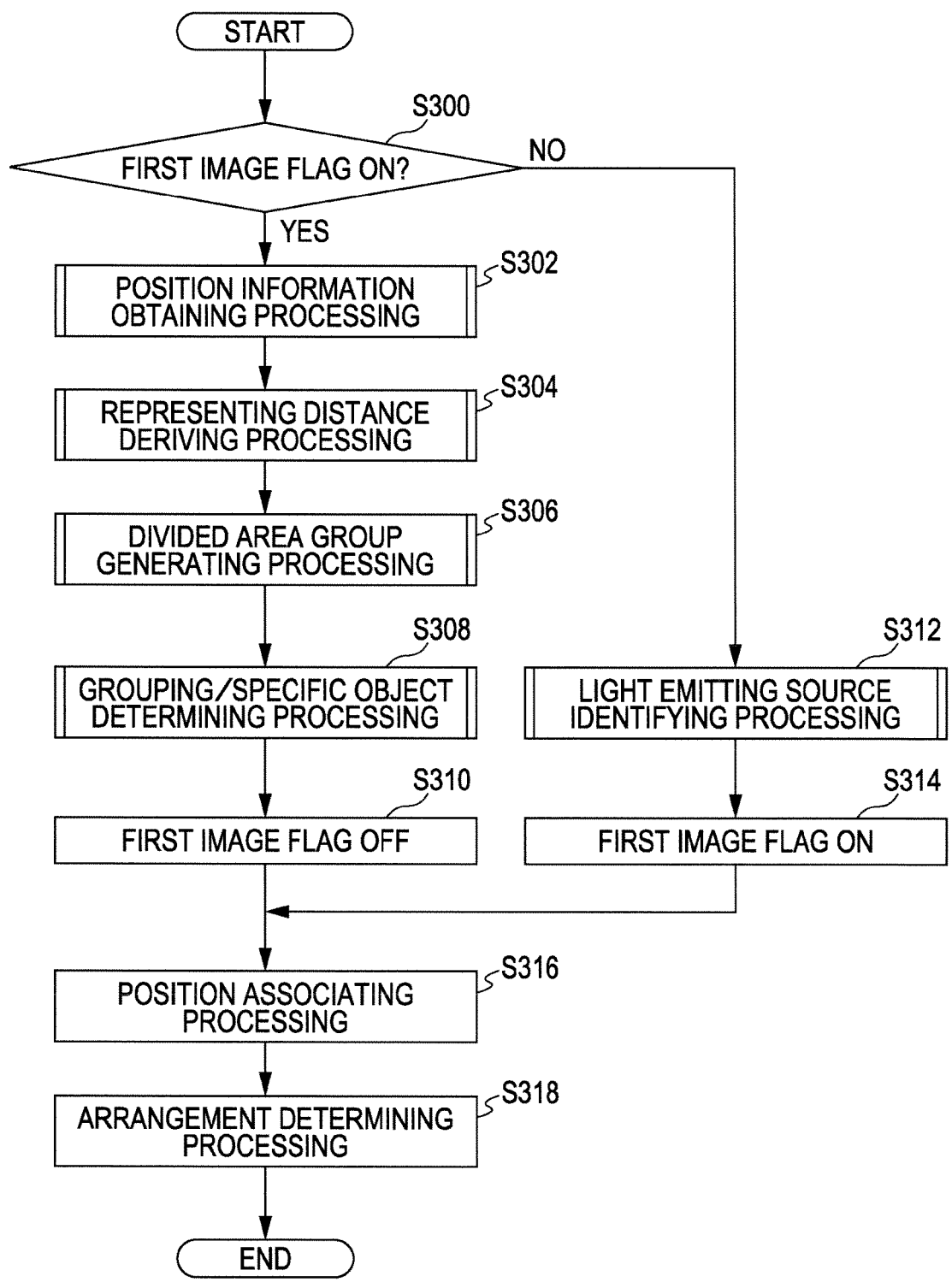
FIG. 10 is a flowchart illustrating a rough flow of processing of an exterior environment recognition method.

Hereinafter, the particular processing performed by the exterior environment recognition device 130 will be explained with reference to the flowcharts of FIGS. 10 to 15. FIG. 10 illustrates an overall flow of interrupt processing when the image processing device 120 transmits the first image or the second image. FIGS. 11 to 15 illustrate individual subroutines therein. In this case, pixels or blocks are used as target portions of processing, and the lower left corners of the luminance image 124 and the distance image 126 are origins. With the pixels, the processing is performed according to the exterior environment recognition method in a range of 1 to 600 pixels in the horizontal direction of the image and 1 to 200 pixels in the vertical direction of the image. With the blocks, the processing is performed according to the exterior environment recognition method in a range of 1 to 150 blocks in the horizontal direction of the image and 1 to 50 blocks in the vertical direction of the image.

As shown in FIG. 10, when an interrupt is raised according to the exterior environment recognition method, a determination is made as to whether the first image flag is ON or not (S300). However, when the power is turned on, the first image flag is set in ON state. The first image flag is a flag for switching whether an image is captured in the first exposure mode or in the second exposure mode. Then, when the first image flag is ON (YES in S300), parallax information of each block in the detection area 122 is converted into three-dimensional position information (S302), and the representing distance 220 is derived for each divided area 216 (S304). Subsequently, the divided areas 216 are grouped, and a divided area group 222 is generated (S306), blocks are tried to be grouped in the divided area group 222 (S308). Subsequently, the first image flag is changed to OFF state, and for subsequent image-capturing process, the exposure mode is set to the second exposure mode (S310).

When the first image flag is in OFF state (NO in S300), a light emitting source is identified from the second image (S312), and the first image flag is changed to ON state, and for subsequent image-capturing process, the exposure mode is set to the first exposure mode (S314).

In this case, identifying processing of the vehicle area as shown in steps S302 to S310 and identifying processing of the light emitting source as shown in steps S312, S314 are executed alternately, and the accuracy for identifying the vehicle area is improved with the position of the light emitting source, and the accuracy for identifying the light emitting source is improved with the position of the vehicle area. As described above, the vehicle area and the light emitting source are associated with each other, whereby the brake lamps can be detected more appropriately.

Then, the position associating unit 174 associates the vehicle area grouped as the specific object "vehicle" by the specific object determining unit 168 with the positions of the brake lamps and the high mount stop lamp which are light emitting sources (S316).

The arrangement determining unit 176 identifies a combination of a high mount stop lamp and two pairs of brake lamps which are provisionally determined to exist in the same preceding vehicle, and determines whether the relative arrangement of the position of the vehicle area and the positions of the two pairs of brake lamps and the high mount stop lamp is in an appropriate arrangement or not (S318). Even if the brake lamps and the high mount stop lamp could not be identified even with the above processing, the luminance image 124 based on the first image is used to identify the positions of the brake lamps on the basis of the relationship in terms of luminance between the brake lamps and the tail lamps and on the basis of the positions of the tail lamps. Hereinafter, the above processing will be explained more specifically.

(Position Information Obtaining Processing S302)

Figure 11:
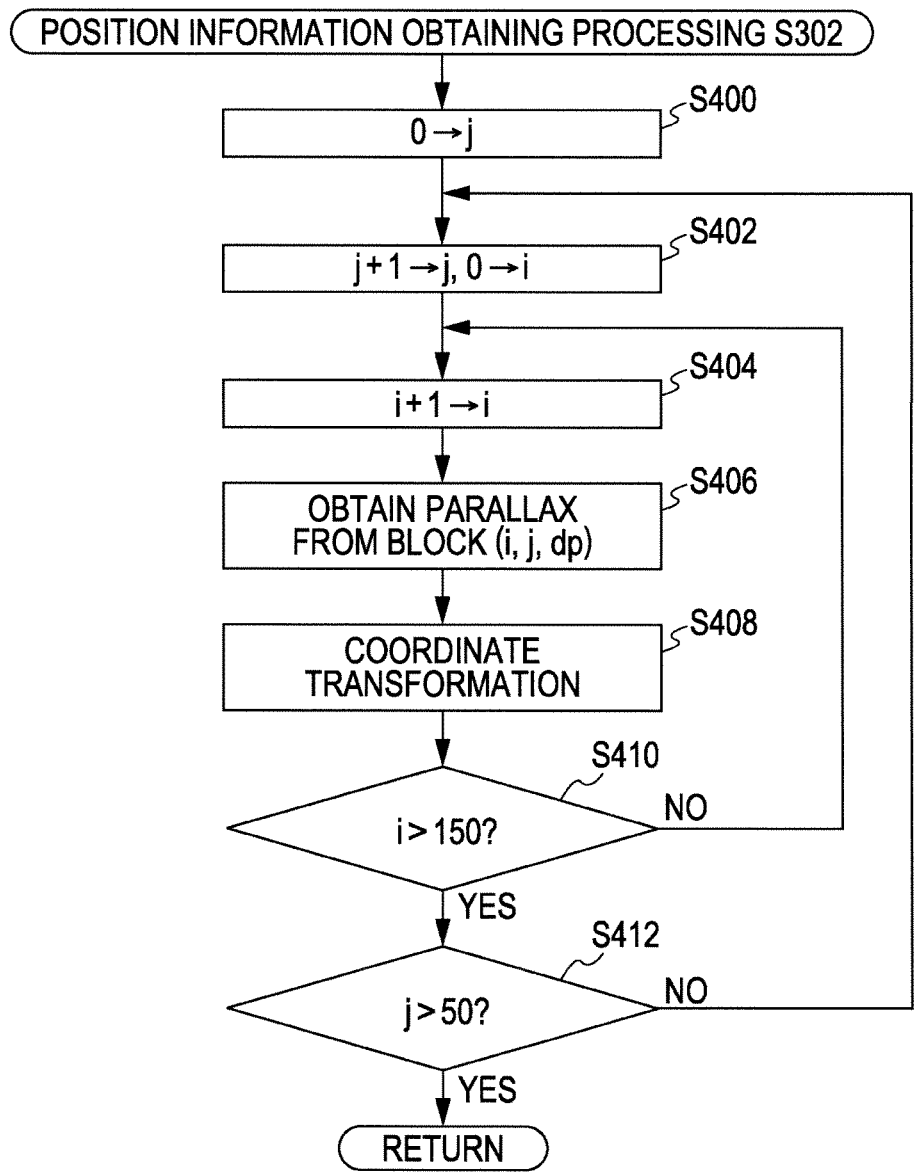
FIG. 11 is a flowchart illustrating a flow of position information obtaining processing.

As shown in FIG. 11, the position information obtaining unit 160 initializes a vertical variable j for identifying a block (substitutes "0" thereinto) (S400). Subsequently, the position information obtaining unit 160 adds "1" to the vertical variable j, and initializes the horizontal variable i (substitutes "0" thereinto) (S402). Subsequently, the position information obtaining unit 160 adds "1" to the horizontal variable i (S404).

The position information obtaining unit 160 obtains parallax information dp from the block (i, j, dp) of the distance image 126 based on the first image (S406). Then, the position information obtaining unit 160 uses the above numerical expressions 1 to 3 to transform the coordinate of the block (i, j, dp) including the parallax information dp into the coordinate of the point (x, y, z) in the real world, thereby making the block (i, j, dp, x, y, z) (S408).

Subsequently, the position information obtaining unit 160 determines whether the horizontal variable i is determined to be more than 150 which is the maximum value of horizontal block (S410), and when the horizontal variable i is determined not to be not more than the maximum value (NO in S410), the processing is repeated from the increment processing of the horizontal variable in step S404. When the horizontal variable i is determined to be more than the maximum value (YES in S410), the position information obtaining unit 160 determines whether the vertical variable j is more than 50 which is the maximum value of vertical block (S412). Then, when the vertical variable j is determined not to be not more than the maximum value (NO in S422), the processing is repeated from the increment processing of the vertical variable j in step S402. When the vertical variable j is determined to be more than the maximum value (YES in S412), the position information obtaining processing S302 is terminated. As described above, the parallax information dp of the distance image 126 is transformed into the three-dimensional position information.

(Representing Distance Deriving Processing S304)

Figure 12:
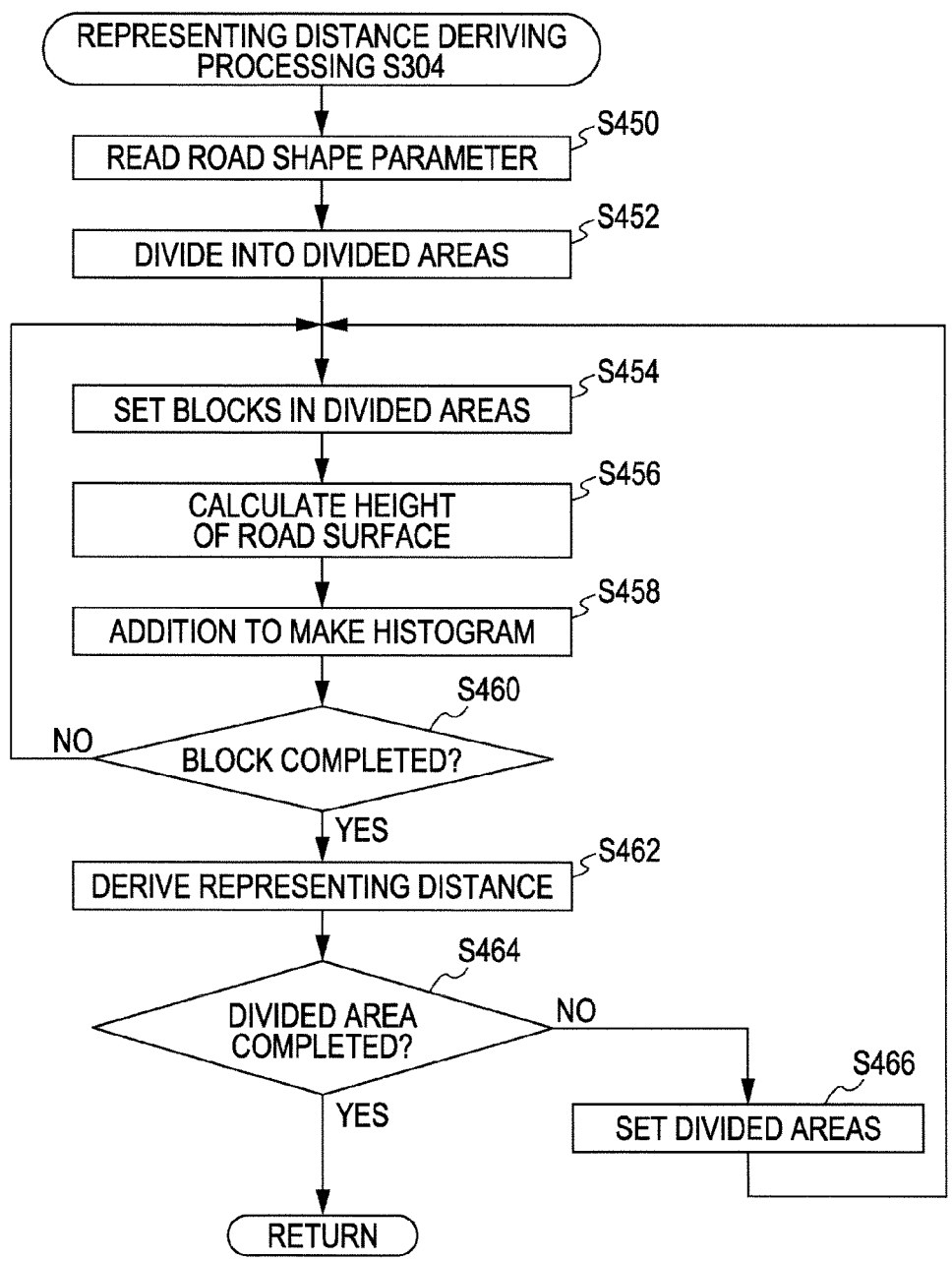
FIG. 12 is a flowchart illustrating a flow of representing distance deriving processing.

As shown in FIG. 12, the representing distance deriving unit 162 reads a road shape parameter (S450), and divides, in the horizontal direction, the detection area 122 into 150 divided areas 216 in units of four pixels, for example (S452). Subsequently, for example, the representing distance deriving unit 162 successively extracts, from the left side in the horizontal direction, one divided area 216 from the divided 150 divided areas 216, and sets any given block (i, j, dp, x, y, z) existing in the divided area 216 (S454).

The representing distance deriving unit 162 calculates a height yr of the road surface at a coordinate z of the block in the real world (S456), and when the block has the coordinate y in the real world which is equal to or more than the height yr of the road surface, the relative distance is added (voted) in a histogram classified into predetermined distances (S458). In this case, the coordinate y of the block in the real world is equal to or more than height yr of the road surface, the block of which height is 0.1 m or less from the road surface is deemed as a white line, contamination, shadow, and the like on the road, and is therefore excluded from processing target. A block located at a level higher than the height of the subject vehicle 1 is also deemed as a pedestrian overpass or a sign, and is therefore excluded from processing target.

The representing distance deriving unit 162 determines whether adding processing to the histogram has been performed on all of the blocks in the extracted divided area 216 (S460). At this occasion, when the adding processing to the histogram is determined not to have been completed on all of the blocks (NO in S460), setting processing S454 and subsequent steps are repeated for blocks on which the adding processing to the histogram has not yet been performed.

When the adding processing to the histogram is determined to have been completed on all of the blocks (YES in S460), the representing distance deriving unit 162 refers to the histogram thus generated, and when the representing distance deriving unit 162 finds a section in which the degree of the histogram (the number of blocks of a relative distance) is a predetermined threshold value (which is set appropriately) or more, the representing distance deriving unit 162 determines that there is a three-dimensional object in the divided area 216. Then, the representing distance deriving unit 162 determines that the relative distance corresponding to the peak is the representing distance 220 (S462).

Then, the representing distance deriving unit 162 determines whether the deriving processing of the representing distance 220 is performed on all the multiple divided areas 216 (S464). At this occasion, when the deriving processing of the representing distance 220 is determined not to be completed on all the divided areas 216 (NO in S464), a new divided area 216 is set (S466), and the block setting processing S454 and subsequent processing are repeated on the new divided area 216. On the other hand, when all the deriving processing of the representing distance 220 is determined to have been completed (YES in S464), the representing distance deriving processing S304 is terminated.

(Divided Area Group Generating Processing S306)

Figure 13:
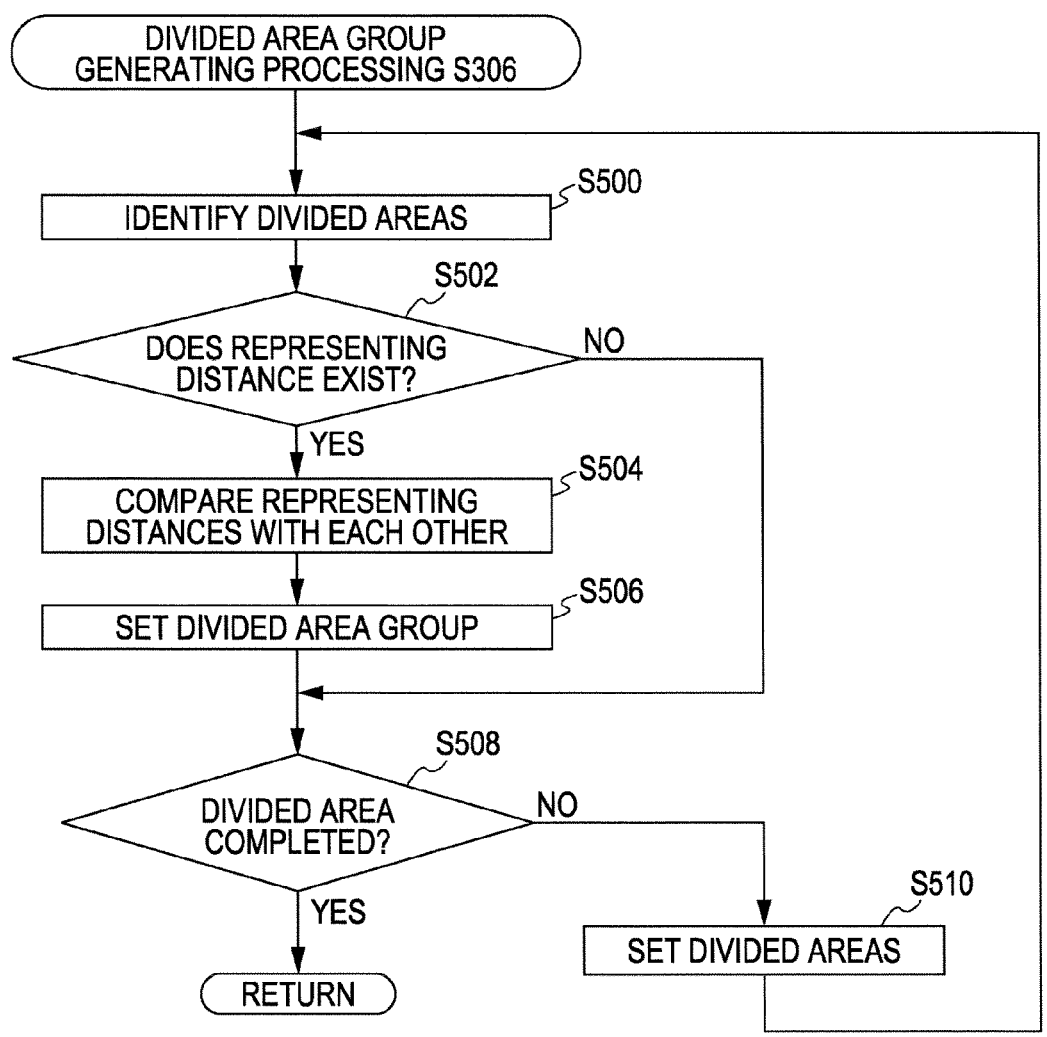
FIG. 13 is a flowchart illustrating a flow of a divided area group generating processing.

As shown in FIG. 13, for example, the divided area group generating unit 164 successively identifies, from the left side in the horizontal direction, any given divided area 216 from the multiple divided areas 216, and also identifies a divided area 216 at the right side in the horizontal direction next to the any given divided area 216 (S500). Then, the divided area group generating unit 164 determines whether there is any representing distance 220 in both of the divided areas 216 (S502). At this occasion, when the resenting distance 220 does not exist in both of the divided areas 216 (NO in S502), processing in a divided area completion determination step S508 is subsequently performed. On the other hand, when the resenting distance exists in both of the divided areas 216 (YES in S502), the representing distances 220 of both of the divided areas 216 are compared with each other (S504).

At this occasion, when the difference between both of the representing distances 220 is equal to or less than a threshold value defined in advance (value at which they are determined to be the same three-dimensional object), both of the representing distances 220 are determined to be in proximity to each other, and the divided area group generating unit 164 groups the divided areas 216 to make a divided area group 222 (S506). At this occasion, when one of the divided areas 216 is already set as a divided area group 222, the other of the divided areas 216 is unified with the divided area group 222.

Then, the divided area group generating unit 164 determines whether generating processing S502, S504, S506 of the divided area group 222 has been performed on all the multiple divided areas 216 (S508). At this occasion, when generating processing S502, S504, S506 of the divided area group 222 has not yet been completed on all the multiple divided areas 216 (NO in S508), a new divided area 216 is set (S510), and the identifying processing S500 and subsequent processing are repeated on the new divided area 216. On the other hand, when all the generating processing of the divided area group 222 is completed (YES in S508), the divided area group generating processing S306 is terminated.

(Grouping/Specific Object Determining Processing S308)

Figure 14:
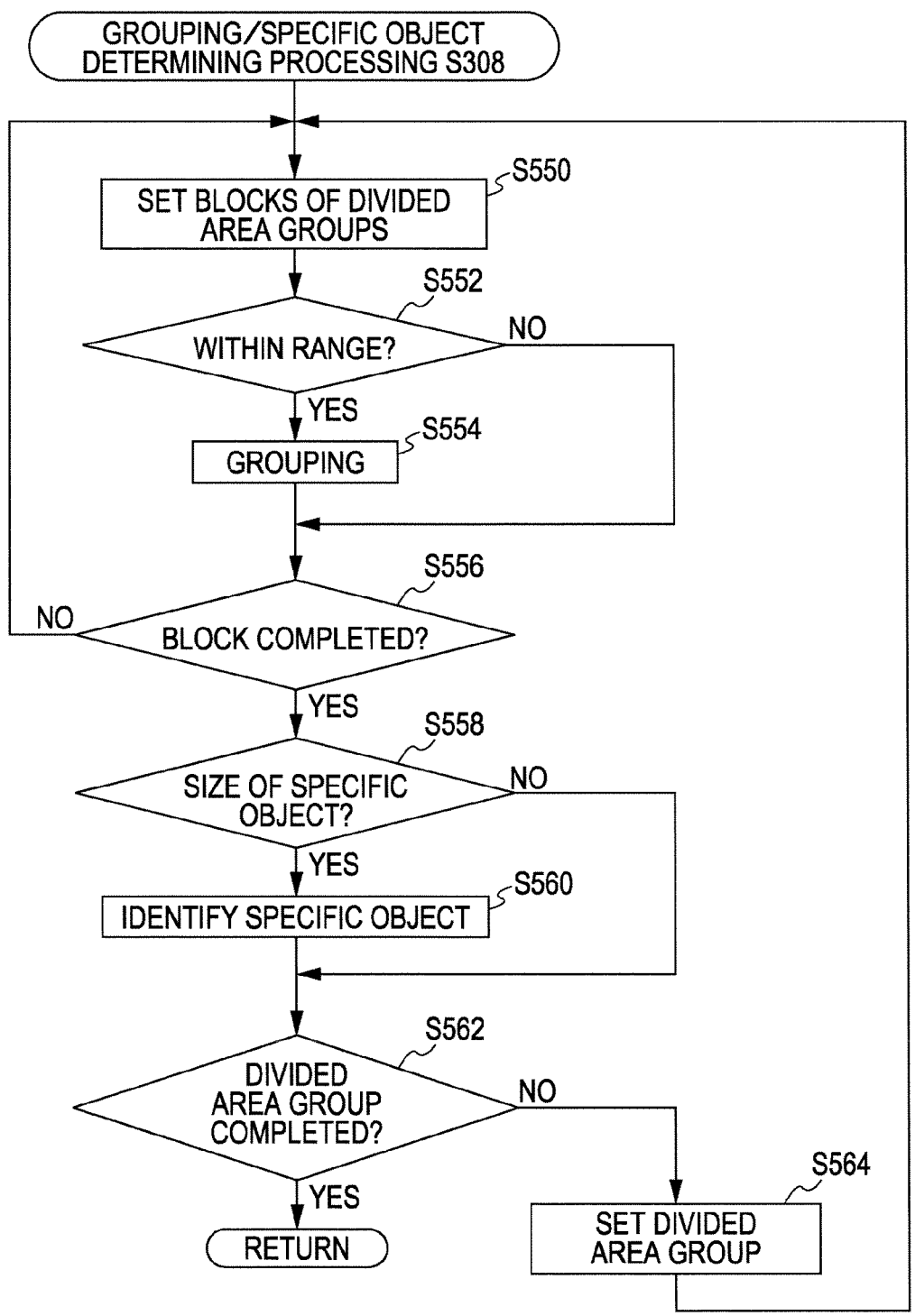
FIG. 14 is a flowchart illustrating a flow of grouping/specific object determining processing.

As shown in FIG. 14, for example, the grouping unit 166 successively extracts, from the left side in the horizontal direction, one divided area group 222 from the multiple, grouped divided area groups 222, and sets any given block (i, j, dp, x, y, z) existing in the divided area group 222.

The grouping unit 166 compares the thus set block (i, j, dp, x, y, z) and a block in the divided area group 222 of which relative distance z corresponds to the representing distance 220, and determines whether the difference of the horizontal distance x, the difference of the height y, and the difference of the relative distance z are within a range defined in advance (for example, within 0.1 m) (S552). When the difference of the horizontal distance x, the difference of the height y, and the difference of the relative distance z are determined to be within the range set in advance (YES in S552), the grouping process is performed while the block in question is provisionally determined to correspond to the same specific object (S554). When the difference of the horizontal distance x, the difference of the height y, and the difference of the relative distance z are determined not to be within the range set in advance (NO in S552), the processing of a block completion determination step S556 is subsequently performed.

The grouping unit 166 determines whether grouping processing has been performed on all of the blocks in the extracted divided area group 222 (S556). At this occasion, when the grouping processing of all the blocks is determined not to have been completed (NO in S556), setting processing S550 and subsequent processing are repeated on the block on which the grouping processing has not yet been performed.

When the grouping processing of all the blocks is determined to have been completed (YES in S556), the specific object determining unit 168 determines whether the size of the entire block group thus made into the group corresponds to the size of the specific object "vehicle" or not (S558). When the size is determined to correspond to the size of the specific object "vehicle" (YES in S558), the block group is determined to be the specific object "vehicle" (S560). When the size is not determined to correspond to the size of the specific object "vehicle" (NO in S558), the processing of a completion determination step S562 concerning the divided area group 222 is subsequently performed.

Then, the grouping unit 166 determines whether the specific object decision determination S558, S560 has been performed on all of the multiple divided area groups 222 (S562). At this occasion, when all the divided area groups 222 are determined not to have been completed (NO in S562), a new divided area group 222 is set (S564), and block setting processing S550 and subsequent processing are repeated concerning the new divided area group 222. On the other hand, when the specific object decision determination S558 is determined to have been completed on all of the multiple divided area groups 222 (YES in S562), the grouping/specific object determining processing S308 is terminated.

In the above grouping, positional relationship between multiple groups are determined in addition. For example, when groups of the same type of three-dimensional objects are such that positions of end points are in proximity and transitions of the relative distance of the three-dimensional objects in the horizontal direction and the vertical direction are almost the same (continuous), they are determined to be the same surface of the same three-dimensional object, and these groups are combined into one group. At this occasion, the transition of the relative distance in the horizontal direction and the vertical direction in the three-dimensional object may be identified by linear approximation by Hough transform or least squares method. In a case of a preceding vehicle, when the relative moving speeds with respect to the z coordinate are the same, multiple groups can be unified into one group.

When the above processing is done in units of blocks, the same information is set in all the pixels in the block, whereby it is changed to processing in units of pixels.

(Light Emitting Source Identifying Processing S312)

As shown in FIG. 15, the light emitting source identifying unit 172 initializes a vertical variable j for identifying a pixel (substitutes "0" thereinto) (S600). Subsequently, the light emitting source identifying unit 172 adds "1" to the vertical variable j, and initializes the horizontal variable i (substitutes "0" thereinto) (S602). Subsequently, the light emitting source identifying unit 172 adds "1" to the horizontal variable i (S604).

The light emitting source identifying unit 172 obtains the luminance br from the pixel (i, j, br) of the luminance image 124 based on the second image (S606). Then, light emitting source identifying unit 172 compares the luminance range 202 of the specific object "brake lamp" and the luminance of the obtained pixel, and determines whether the luminance of the obtained pixel is included in the luminance range 202 of the specific object "brake lamp" (S608). When the luminance is determined not to be included in the luminance range 202 (NO in S608), the processing of a horizontal block determining processing S616 is subsequently performed. When the luminance is determined to be included in the luminance range 202 (YES in S608), the light emitting source identifying unit 172 provisionally determines that the pixel is the specific object "brake lamp" (S610).

Then, the light emitting source identifying unit 172 determines whether the difference of horizontal distance x between the specific object "brake lamp" and the another pixel provisionally determined, the difference of the height y therebetween, and the difference of the relative distance z therebetween are within the predetermined range or not (S612). When the difference of horizontal distance x between the specific object "brake lamp" and the another pixel provisionally determined, the difference of the height y therebetween, and the difference of the relative distance z therebetween are determined to be within the predetermined range (YES in S612), both pixels are made into a group as the specific object "brake lamp" (S614). When the difference of horizontal distance x between the specific object "brake lamp" and the another pixel provisionally determined, the difference of the height y therebetween, and the difference of the relative distance z therebetween are determined not to be within the predetermined range (NO in S612), the processing in a horizontal block determining processing S616 is subsequently performed.

Subsequently, the light emitting source identifying unit 172 determines whether the horizontal variable i is determined to be more than 600 which is the maximum value of horizontal block (S616), and when the horizontal variable i is determined not to be not more than the maximum value (NO in S616), the processing is repeated from the increment processing of the horizontal variable i in step S604. When the horizontal variable i is determined to be more than the maximum value (YES in S616), the light emitting source identifying unit 172 determines whether the vertical variable j is more than 200 which is the maximum value of vertical block (S618). Then, when the vertical variable j is determined not to be not more than the maximum value (NO in S618), the processing is repeated from the increment processing of the vertical variable j in step S602. When the vertical variable j is determined to be more than the maximum value (YES in S618), the processing in a lightness determining processing S620 is subsequently performed. As described above, multiple pixel groups which are provisionally determined to be the specific object "brake lamp" are generated.

Subsequently, the light emitting source identifying unit 172 determines whether the level of light of the exterior environment obtained by means of an illumination meter and the like is less than a second threshold value defined in advance (S620). When the level of light of the exterior environment is determined to be less than the second threshold value (YES in S620), a lower (looser) value (for example, 0.05 m) is set as the first threshold value, and when the level of light of the exterior environment is determined to be equal to or more than the second threshold value or more (NO in S620), a higher (stricter) value (for example, 0.1 m) is set as the first threshold value.

Subsequently, the light emitting source identifying unit 172 provisionally determines the specific object "brake lamp", and successively sets a pixel group from among multiple pixel groups thus grouped (S626).

Subsequently, the light emitting source identifying unit 172 determines whether the size of the pixel group thus set is equal to or more than the third threshold value indicating the size of the high mount stop lamp (S628). When the size of the pixel group is determined to be equal to or more than the third threshold value (YES in S628), the pixel group is identified as the high mount stop lamp, and the processing of a pixel group completion determination step S636 is subsequently performed (S630). When the size of the pixel group is determined to be less than the third threshold value (NO in S628), the light emitting source identifying unit 172 determines whether the size of the pixel group thus set is equal to or more than the first threshold value indicating the size of the brake lamp (S632). When the size of the pixel group is determined to be equal to or more than the first threshold value (YES in S632), the pixel group is identified as the brake lamp, and the processing of the pixel group completion determination step S636 is subsequently performed (S634). When the size of the pixel group is determined to be less than the first threshold value (NO in S632), the processing in the pixel group completion determination step S636 is subsequently performed.

The light emitting source identifying unit 172 determines whether the pixel group size determining processing has been performed on all the pixel groups (S636). At this occasion, when the pixel group size determining processing is determined not to have been completed on all the pixel groups (NO in S636), the setting processing S626 and subsequent processing are repeated on the pixel groups on which the grouping processing has not yet been performed. On the other hand, when the pixel group size determining processing is determined to have been completed on all the pixel groups (YES in S636), the light emitting source identifying processing S312 is terminated.

According to the exterior environment recognition device 130 and the exterior environment recognition method explained above, absolute luminance obtained when the light emitting source is in ON state is used, and therefore, whether the light emitting source is turned on or not can be determined with a high degree of accuracy. Therefore, for example, whether the brake lamp is turned on or not can be accurately found out, and this allows quick and accurate estimation of deceleration operation of the preceding vehicle.

In addition, a program for causing a computer to function as the exterior environment recognition device 130 and a storage medium such as a computer-readable flexible disk, a magneto-optical disk, a ROM, a CD, a DVD, a BD storing the program are also provided. Here, the program means a data processing function described in any language or description method.

The preferred embodiment of the present invention has been described hereinabove with reference to the appended drawings but it is to be understood that the present invention is not limited to such embodiment. It is clear that a person skilled in the art could conceive of various kinds of modifications and changes may within the scope of the claims, and it should be understood that those are also included in the technical scope of the present invention.

In the above embodiment, in particular, the brake lamp and the high mount stop lamp are explained, for example. However, the embodiment is not limited thereto. Examples of light emitting sources that can be recognized by changing the exposure mode include a tail lamp and a turn signal. In this case, when the tail lamp is detected, cruising of a preceding vehicle at a constant speed at night can be found out, and when the turn signal is detected, deceleration for left turn and right turn can be found out quickly.

In the above embodiment, the three-dimensional position of the target object is derived based on the parallax between image data using the plurality of imaging devices 110. However, the present invention is not limited to such case. For example, a variety of known distance measuring devices such as a laser radar distance measuring device can be used. In this case, the laser radar distance measuring device emits laser beam to the detection area 122, receives the light reflected when the laser beam is shone upon the object, and measures the distance to the object based on this required time.

In the above embodiment, the relative distance of a block is obtained using the distance image 126, but when the block can somewhat be determined to a specific object on the basis of the arrangement and the size of the target object on the screen, the present embodiment can also be carried out using a monocular imaging device 110. A specific object can also be identified by deriving a motion vector using optical flow.

In the above embodiment, the imaging device 110 is considered to capture a color image. However, the embodiment is not limited thereto. Alternatively, the present embodiment can also be carried out by obtaining a monochrome image.

In the above embodiment, for example, the position information obtaining unit 160 receives the distance image (parallax information) 126 from the image processing device 120, and generates the three-dimensional position information. However, the present invention is not limited to such case. The image processing device 120 may generate the three-dimensional position information in advance, and the position information obtaining unit 160 may obtain the generated three-dimensional position information. In this manner, when the functions are distributed, the processing load of the exterior environment recognition device 130 can be reduced.

In the above embodiment, the position information obtaining unit 160, the representing distance deriving unit 162, the divided area group generating unit 164, the grouping unit 166, the specific object determining unit 168, the luminance obtaining unit 170, the light emitting source identifying unit 172, the position associating unit 174, the arrangement determining unit 176, and the brake lamp identifying unit 178 are configured to be operated by the central control unit 154 with software. However, the functional units may be configured with hardware.

The steps of the exterior environment recognition method in this specification do not necessarily need to be processed chronologically according to the order described in the flowchart. The steps may be processed in parallel, or may include processing using subroutines.

The present invention can be used for the exterior environment recognition device and the exterior environment recognition method that recognize environment outside of the subject vehicle.

The invention claimed is:

1. An exterior environment recognition device comprising:
   an image obtaining unit for sequentially obtaining a first image and a second image that are generated by alternately performing capture in a first exposure mode according to a level of light of an exterior environment and capture in a second exposure mode of which exposure time is different from the first exposure mode and which allows determination as to whether a light emitting source is emitting light by itself or not;
   a vehicle identifying unit for identifying, based on the first image, a vehicle area occupied by a vehicle preceding in a detection area;
   a light emitting source identifying unit for identifying a position of the light emitting source, based on luminance of the second image; and
   a position associating unit for associating the position of the light emitting source and the vehicle area.

2. The exterior environment recognition device according to claim 1, wherein the light emitting source identifying unit groups, on the basis of a relative distance between pixels which are adopted as candidates of a light emitting source, multiple pixels into one light emitting source candidate, and only when a size of the light emitting source candidate is equal to or more than a first threshold value defined in advance, the light emitting source candidate is identified as the light emitting source.

3. The exterior environment recognition device according to claim 2, wherein multiple first threshold values are provided in advance at multiple steps in accordance with the level of light of the exterior environment.

4. The exterior environment recognition device according to claim 1, further comprising an arrangement determining unit which determines whether relative arrangement of the position of the light emitting source and the vehicle area associated by the position associating unit is appropriate arrangement or not.

5. The exterior environment recognition device according to claim 4, wherein:
   the light emitting source includes a brake lamp and a high mount stop lamp,
   the light emitting source identifying unit groups, on the basis of a relative distance between pixels which are adopted as candidates of a light emitting source, multiple pixels into one light emitting source candidate, and only when a size of the light emitting source candidate is equal to or more than a third threshold value defined in advance, the light emitting source candidate is identified as the high mount stop lamp,
   when the light emitting source candidate is identified as the high mount stop lamp, the arrangement determining unit recognizes the vehicle area is a vehicle that has a high mount stop lamp, and
   when it is determined that a brake lamp is turned on but the high mount stop lamp is not detected, the arrangement determining unit determines that the brake lamp is not turned on.

6. The exterior environment recognition device according to claim 1, wherein the light emitting source is at least one of a brake lamp, a high mount stop lamp, a tail lamp, and a turn signal.

7. The exterior environment recognition device according to claim 1, wherein:
   the light emitting source includes a brake lamp and a tail lamp, and
   the exterior environment recognition device further includes a brake lamp identifying unit for identifying the position of the brake lamp, on the basis of relationship in terms of luminance between the brake lamp and the tail lamp and the position of the tail lamp.

8. The exterior environment recognition device according to claim 7, wherein:
   the light emitting source includes a brake lamp and a tail lamp, and
   the brake lamp identifying unit detects the position of the tail lamp by identifying a portion, where an R component is high and a luminance value is high, and, based on the information on the tail lamp, determines that brake lamp is turned on when there is increase in the luminance value of the position of the tail lamp in the second image.

9. An exterior environment recognition method comprising:
   a step in which an imaging device alternately performs capture in a first exposure mode according to a level of light of an exterior environment and capture in a second exposure mode of which exposure time is different from the first exposure mode and which allows determination as to whether a light emitting source is emitting light by itself or not;
   a step in which an exterior environment recognition device sequentially obtains a first image captured in the first exposure mode and a second image captured in the second exposure mode;
   a step in which a vehicle area occupied by a vehicle preceding in a detection area is identified based on the first image;
   a step in which a position of the light emitting source is identified based on luminance of the second image; and a step in which the position of the light emitting source and the vehicle area are associated.

* * * * *